2 Sheets. Sheet 1.

EDWARD H. STEARNS.

Improvement in Head Blocks.

No. 4,625. Reissued Nov. 7, 1871.

Witnesses.
A. M. Stout Jr.
Charles Cohnn

Inventor.
Edward H. Stearns
by A. Crawford
Atty

Sheet 2.

EDWARD H. STEARNS.

Improvement in Head Blocks.

No. 4,625. Reissued Nov. 7, 1871.

Witnesses.
A. M. Stout Jr.
Charles Atkins

Inventor.
Edward H. Stearns
by F. Crawford
Atty.

N.Y. PHOTO-LITHOGRAPHIC CO. N.Y. (SUNKEN PROCESS)

UNITED STATES PATENT OFFICE.

EDWARD H. STEARNS, OF ERIE, PENNSYLVANIA.

IMPROVEMENT IN HEAD-BLOCKS.

Specification forming part of Letters Patent No. 81,837, dated September 1, 1868; reissue No. 4,625, dated November 7, 1871.

*To all whom it may concern:*

Be it known that I, EDWARD H. STEARNS, of Erie, in the county of Erie, in the State of Pennvania, have invented certain Improvements in Head-Blocks for Saw-Mills, of which the following is a specification:

The object of this invention is to improve the head-blocks of saw-mills; and it consists: First, in the means employed for automatically throwing back the knees of a head-block, after a log has been successively set forward to the saw and has been sawed into lumber, to a position to receive another log, and be in like manner set tranversely to the saw. Second, in a mechanism for stopping or limiting the backward movement of the knees to accord with the size or diameter of the logs to be sawed. Third, in the means employed for avoiding sudden jars and concussion at the termination of such backward movement of the knees. Fourth, in the construction and arrangement of devices, whereby the device for stopping or limiting the backward movement of the knees is connected with two or more head-blocks having the stop-devices that are operated in the same carriage, so that the stop movement can be simultaneously operated upon in all the blocks on the carriage by a single lever and stop all the knees at the same distance from the saw-line. Fifth, in the construction of a device by which the dogs, that hold the log in contact with the knees, after being liberated from the remnant of the sawed log will automatically adjust themselves out of the way, so that they will not interfere with the backward movement of the knees or anything or mechanism pertaining to the head-block, and will always be in a position most convenient to be grasped for the dogging of another log.

Figure 1:
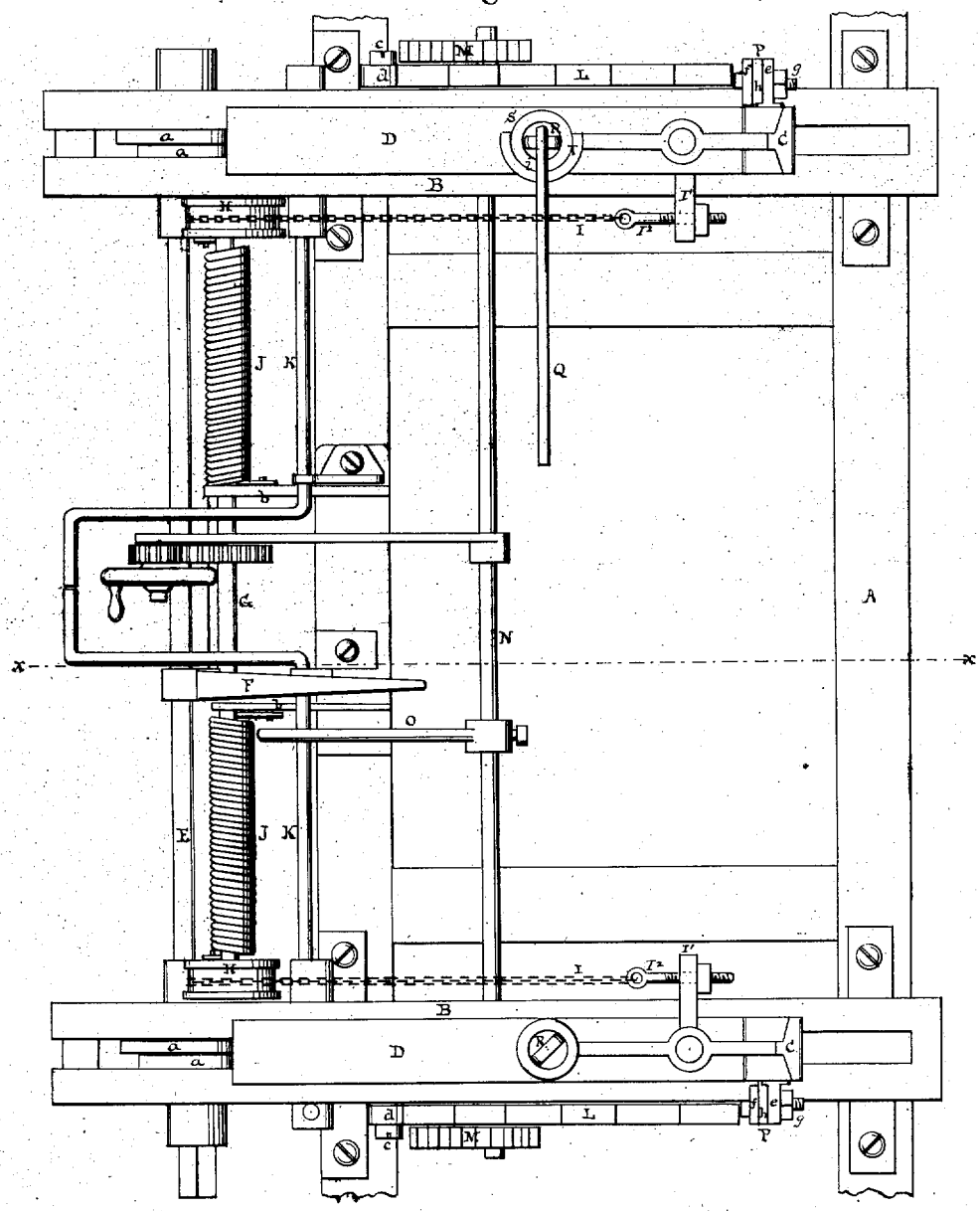
Figure 2:
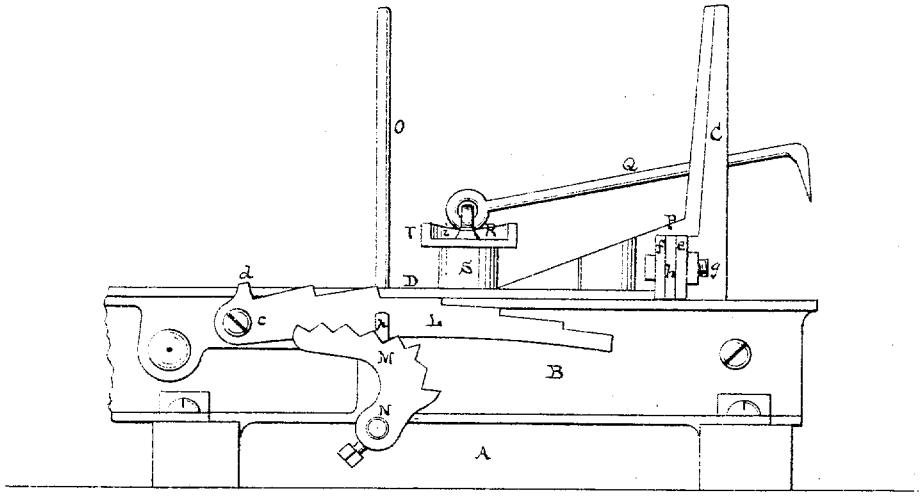
Figure 3:
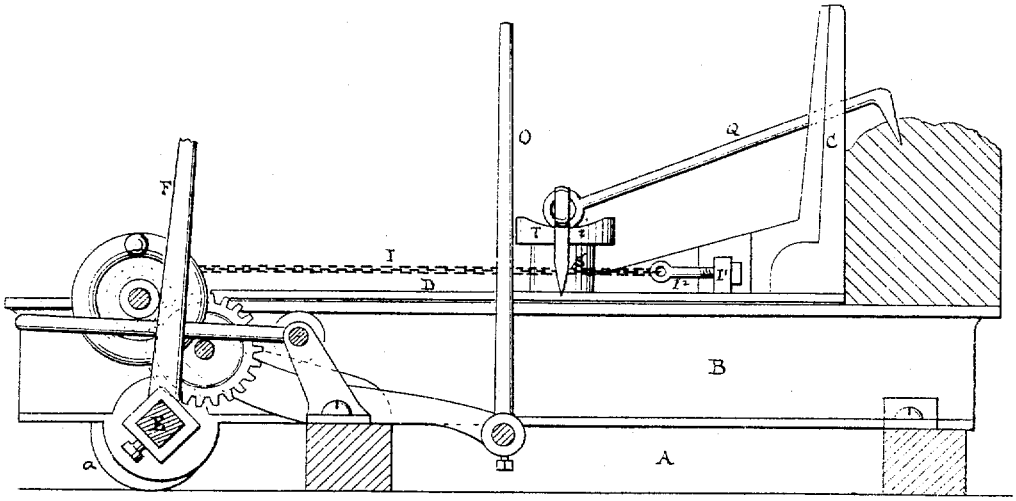

In the drawing, Figure 1 is a plan or top view of a carriage with two head-blocks thereon and the improvements attached; Fig. 2, an end view of same; and Fig. 3 is a transverse vertical section of the same taken in the line *x x*, Fig. 1.

In the accompanying drawing, A represents the longitudinal sides of a log-carriage. B B are the two knee-guides of the head-block, placed transversely upon the carriage A. C C are the upright knees, connected to or cast with the slides D D, which are fitted in the guides in such a manner that they may move freely back and forth thereon. The knees C C may be set forward with the log by any suitable means; but the device best calculated for such purpose was patented by me April 15, 1856. G is a shaft, which has its bearings in the guides B and in lugs *b b* attached to the carriage-sides A. This shaft has a pulley, H, keyed on said shaft near each block, and attached to each of these pulleys is a chain, I, which chains are connected to the slides D D by means of arms $I^1$ and temper-screw $I^2$, as seen in Figs. 1 and 3. On and around shaft G are spiral springs J J, which are wound around said shaft, connected at one end to the pulleys H H, the opposite or inner ends to the bearings or lugs *b b* that support the central or that part of shaft G intermediate between the head-blocks. These springs, when the knees C C are being moved forward or the log set to the saw, are being wound up or coiled as the operation of setting the knees to the saw carries with them the end of chain I, which, being previously wound around pulleys H, causes the pulleys and shaft to revolve within the springs, while that end of the spring that is attached to the lugs *b* cannot revolve; consequently the power of the springs is thus obtained; and any time when the slides D D are liberated from the means which moved them and the knees forward to set the log to the saw the springs J J will be free to unwind themselves, and will draw the slides and knees instantly back to any point at which they may be stopped. In order to liberate the slides from the means that set them forward, shafts K K, with cams on their ends, are employed to throw the pawls out of gear with the rack on the under side of the slides; but other means could, of course, be employed, having a different mechanism for setting the log to the saw, or for forcing that mechanism out of gear with the racks.

I do not confine myself to the pulleys and chains for forming a connection between the slides and springs J, as a rack and pinion and various other means may answer for the same purpose, as can be suggested by those skilled in the art; neither do I confine myself to spiral springs J, for coiled springs may be used, as well as other springs; but the spiral spring is preferred. By this construction and arrangement of parts all hand-work or manipulation of any kind is avoided in the drawing back of the slides and knees, thereby saving both time and labor. Another advantage is, either one of the knees may be advanced separately or independently of the other, or both may be instantly brought back into line with each other and there stopped.

L L are notched segment-bars pivoted to the outer sides of the knee-guides, as shown at *c*, Fig. 2, and can be raised or lowered to a greater or less height in order to present the proper notch against which the knees are to be stopped in their backward movement. M M are notched eccentrics or cams attached one at each end of longitudinal shaft N, which vibrates in bearings on the knee-guides in such position that a lug, *r*, that projects from the outer sides of lever L will rest in any one of the notches on the cam. The segment-bars L may be and are raised and lowered to a greater or less height by means of the notched eccentric cams M on the shaft N and hand-lever O, attached at any convenient point on said shaft N. When the cams M are so adjusted as to admit of the notches on bars L to be below the surface of the guides the knees can be brought back their extreme distance, as the stop or projecting arm P attached to the knees comes in contact with the rear notch or shoulder *d* on the segment-bar L; but when the forward end of the segment-bars L are raised so as to bring an advanced notch above the guides, the arm P will strike against it and arrest a further backward movement of the knees, and the more the forward end of bars L are raised the less backward movement of the knees will be had. Hence the backward movement of the knees may be regulated to agree with the diameter of the log next to be sawed, and from the same position or stand-point that the setting-lever is operated.

By the construction and arrangement of the contrivances above described for moving the knees of the head-blocks on the carriage toward or from the saw-line the attendant is enabled to control such movements and stop the knees at any point desired from the saw-line from a single stand-point, thus saving much time, securing greater accuracy, and with less care than if each knee was separately manipulated or operated upon. In order to avoid jars or concussions when the projecting stop P strikes against a notch on bar L, a buffer is interposed between the arm *e* and any notch on bar L that it strikes against, which buffer is composed of spring *n* and plate *f* and bolt *g*. The metal plate *f* strikes against the notch, and the spring *n*, which may be of rubber or other material, is interposed between the plate *f* and arm *e*, while bolt *g* goes entirely through the arm *e*, spring *n*, and into or through plate *f*; but preferably the bolt *g* goes through and slides freely in holes in both the arm *e* and spring *n*, and has a screw-thread cut on its rear end, and is screwed into plate *f*, and has a head on its forward end.

By this construction a good and efficient buffer-stop for the knees is obtained, effectually obviating all jars or concussion of the parts, preventing unnecessary wear of parts. Q Q are the holding-dogs, which are constructed in the usual or any proper manner, the inner ends of which are hooked in a swivel or eyebolt, R, fitted in sockets S on the upper surfaces of the slides D D. The socket S, instead of being of equal height all around, is constructed with an upwardly-projecting flange, T, on the inner sides of the socket S, and has concave upper edges, as shown in Fig. 3 at *i*, so that when a dog is freed or raised from a log and drops it will, in coming in contact with the flange T, slide to the center of the concave *i* in the upper edge of the flange, and in so doing will assume a position at right angles with the knee-guides and parallel with the sides of the log-carriage, as seen in Fig. 1, and thus be automatically adjusted out of the way of all or any of the working parts of the head-blocks, and without danger of obstructing the knees in their backward movement; and no attention on the part of the sawyer is required in order to effect that end. Independent of the setting devices, no provision has heretofore been made for simultaneously arresting or stopping at any desired point the backward movement of the knees of two or more head-blocks on the same carriage by connecting the stopping devices with a mechanism that will cause such device, whether one or many head-blocks, to simultaneously act to stop each knee of a series of head-blocks at an equal distance from the saw-line, which has made the labor much greater, for the attendants had to operate the devices for stopping such backward movement upon each head-block separately, requiring time and care to accomplish.

Having thus described my invention, I claim as new and desire to secure by Letters Patent—

1. In head-blocks for saw-mills, the employment of springs, so applied that when the knees are released from the setting mechanism the springs will automatically force the knees back to the required position for the next advancing movement, substantially as set forth.

2. The segment-bars L, constructed, arranged, and applied in the manner shown, or in any equivalent way, for the purpose of limiting the backward movement of the knees, as set forth.

3. The projecting arm *e* on knee C, in combination with the notched segment-bar L, or equivalent devices for stopping the backward movement of the knee, in the manner and for the purpose described.

4. The shaft N, notched cams M, in combination with segment-bar L having lug *r*, in the manner and for the purpose described.

5. The elastic buffer-stop P, composed of arm *e*, spring *n*, plate *f*, and bolt *g*, in combination with the segment-bar L, in the manner and for the purpose described.

6. The shaft G, pulley H, spring J, and chain I, in combination with the knee C of a head-block, in the manner and for the purpose described.

7. The supporting knee-guides B B and B B of two head-blocks with their knees C C, slides D D, and their actuating devices, the notched cams M, and segment-bars L, one on each head-block, in combination with the single extended shaft N and lever O, in the manner and for the purpose shown.

8. The shaft K having a cam on its end to throw the pawls out of gear with the rack, in combination with the shaft G, pulley H, chain I, and knee C, in the manner and for the purpose described.

9. The flanges T on sockets S, for the purpose of carrying and adjusting the dogs Q when they are disengaged from the log, substantially as described.

10. The head-block herein described, having attached thereto and operating therewith a mechanism for setting the knee toward the saw, a device for unlocking that mechanism and forcing it out of contact with the rack on the slide, a device for causing the knee to make a backward movement, and a device for stopping the backward movement at any desired point, constructed and arranged to operate in the manner substantially as described.

E. H. STEARNS.

Witnesses:
J. A. LOWNDES,
CHARLES CHINN.

(130)